United States Patent [19]
von Ehrenstein

[11] 3,723,741
[45] Mar. 27, 1973

[54] METHOD FOR EFFECTING NUCLEAR POLARIZATION OF A BEAM OF ATOMS

[75] Inventor: Dieter von Ehrenstein, Naperville, Ill.

[73] Assignee: The United States of America as represented by the United States Atomic Energy Commission

[22] Filed: Sept. 1, 1971

[21] Appl. No.: 177,058

[52] U.S. Cl. ................. 250/84, 250/41.3, 313/63
[51] Int. Cl. ........................................... H01j 37/00
[58] Field of Search .............. 250/41.3, 84; 313/63

[56] References Cited

UNITED STATES PATENTS 3,569,705   3/1971   Kaminsky ........................... 250/84

*Primary Examiner*—William F. Lindquist
*Attorney*—Roland A. Anderson

[57] ABSTRACT

A beam of atoms is passed through a magnetically saturated mono-crystalline material to effect a charge-transfer reaction between the material and the atomic beam. The atomic beam is then sequentially passed through a first strong magnetic field region shaped decreasing from maximum field to zero field, a zero magnetic field region, and a second strong magnetic field region opposite in polarity to the first strong magnetic field region and shaped from zero field to maximum field to effect nuclear polarization of said atomic beam.

3 Claims, 4 Drawing Figures

PATENTED MAR 27 1973 3,723,741

Inventor
D Von Ehrenstein
Attorney

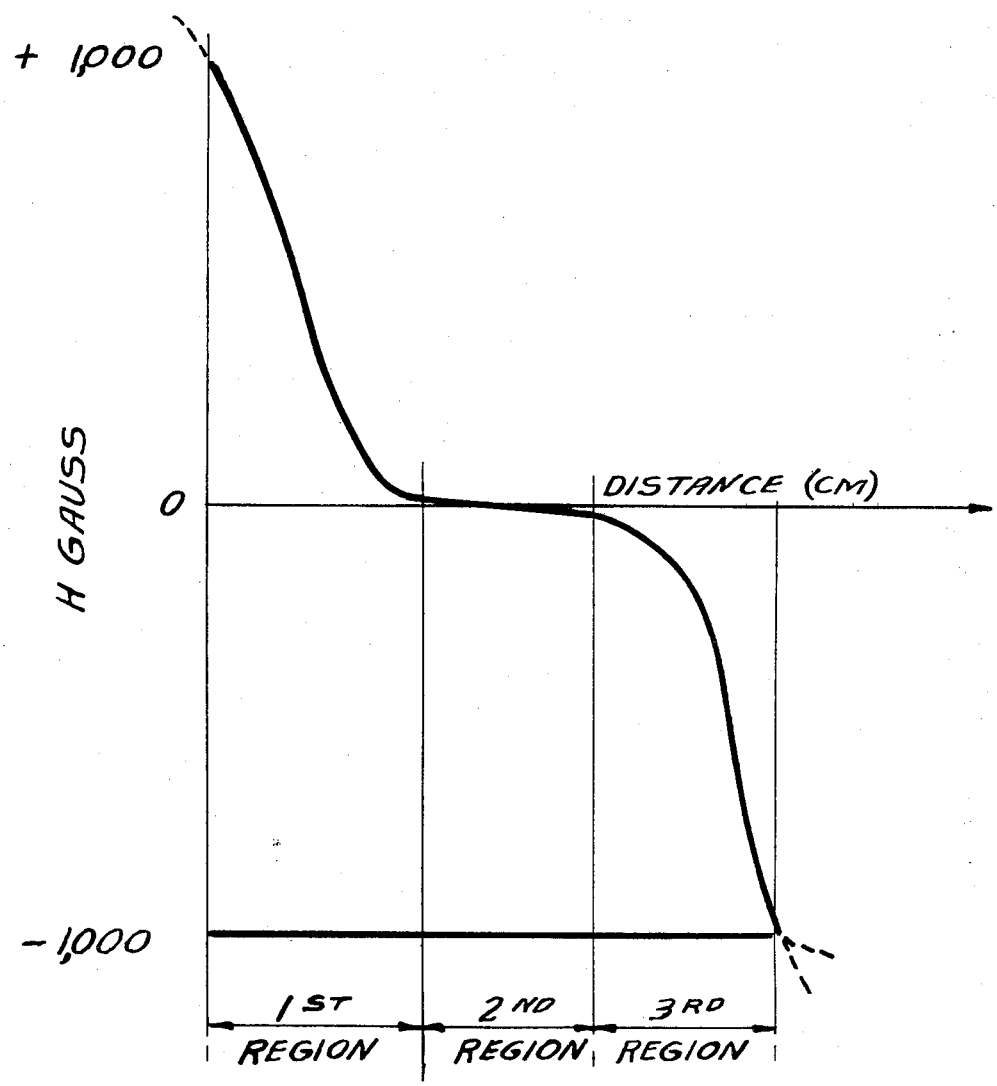

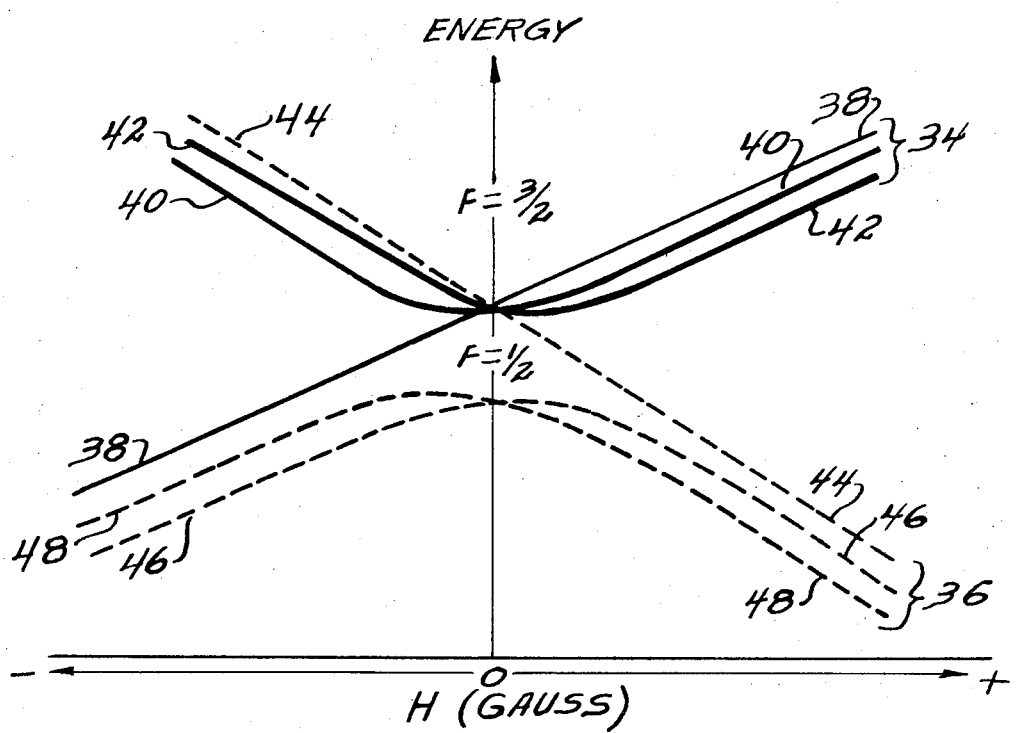

METHOD FOR EFFECTING NUCLEAR POLARIZATION OF A BEAM OF ATOMS

CONTRACTUAL ORIGIN OF THE INVENTION

The invention described herein was made in the course, of, or under, a contract with the United States Atomic Energy Commission.

BACKGROUND OF THE INVENTION

The present invention relates to methods for producing nuclear-polarized atomic beams.

Nuclear-polarized atomic beams are used in particle accelerators to strike targets of interest. M. S. Kaminsky in his U.S. Pat. No. 3,569,705 entitled "A Method for Producing Polarized Atoms," issued Mar. 9, 1971 teaches that polarized atoms may be produced by passing a collimated beam of atoms through a magnetic monocrystalline material parallel to a lattice channel in the material so as to effect a charge-transfer reaction between the material and the atomic beam. The beam is then passed through an external dipole magnetic field to effect nuclear polarization of the beam by hyperfine interaction. Using this process, the atoms in the output beam attain a maximum vector nuclear polarization of ± 0.5 for hydrogen atoms and ± 0.33 for deuterium atoms as contrasted to a theoretical limit of ± 1.0. It is desirable for accelerator usage that the atoms in the output beam have complete vector nuclear polarization. Further, in the method taught by Kaminsky, pure vector nuclear polarization of deuteron atoms cannot be obtained because tensor polarization is always present.

Accordingly, it is one object of the present invention to provide a method for generating a beam of atoms having a pure vector nuclear polarization.

It is another object of the present invention to provide a method for generating a beam of deuterium atoms of lithium-6 atoms wherein the atoms have a vector nuclear polarization of ±0.66.

It is another object of the present invention to provide a method for generating a beam of deuterium atoms or lithium-6 atoms having a tensor nuclear polarization of zero and a vector nuclear polarization of ±0.66.

It is another object of the present invention to provide a method for generating a beam of hydrogen atoms or helium-3 atoms wherein the atoms have a vector nuclear polarization of ± 1.0.

It is another object of the present invention to provide an improved method for generating nuclear-polarized atoms.

Further objects of the present invention will become more apparent as the detailed description proceeds.

SUMMARY OF THE INVENTION

The method of the present invention is effected with a beam of atoms which has been passed through a magnetically saturated monocrystalline material to effect a charge-transfer reaction between the material and the atomic beam. The atomic beam is then sequentially passed through a first strong magnetic field region shaped decreasing from maximum field to zero field, a zero magnetic field region, and a second strong magnetic field region opposite in polarity to the first strong magnetic field region and shaped from zero field to maximum field to effect a nuclear polarization of said atomic beam.

DESCRIPTION OF THE DRAWINGS

Further understanding of the present invention may best be obtained from consideration of the accompanying drawings wherein:

FIG. 3 is a graphical plot of a typical magnetic field to effect the transition of the method of the present invention.

FIG. 4 is a hyperfine-structure diagram of deuterium atoms as they pass through the apparatus of FIG. 1.

DESCRIPTION OF THE PREFERRED EMBODIMENT

In the method of the present invention a beam of atoms (positive ions, negative ions or neutral atoms) is generated and highly collimated in a partial vacuum to pass through a magnetically saturated monocrystalline material. The atomic beam is directed so that, in passing through the magnetically saturated monocrystalline material, a charge-transfer reaction is effected between the beam and the monocrystalline material whereby the atomic beam acquires polarized electrons. The beam emerging from the monocrystalline material is thus a polarized beam of atoms.

Subsequent to passage through the monocrystalline material, the beam is passed through a shaped magnetic field. The shaped magnetic field has three regions. The first region comprises a strong magnetic field decreasing from maximum field to essentially a zero field and having the same directional sense as the direction of the field of magnetization of the monocrystalline material. The second region is a region of essentially zero magnetic field and includes the zero field crossing from the first region to the third region, which is a second strong magnetic field opposite in polarity to the first strong magnetic field and shaped from essentially a zero field to a maximum field. The polarized atomic beam is sequentially passed through the first, second, and third field regions wherein nuclear polarization of the beam is effected.

Figure 1:
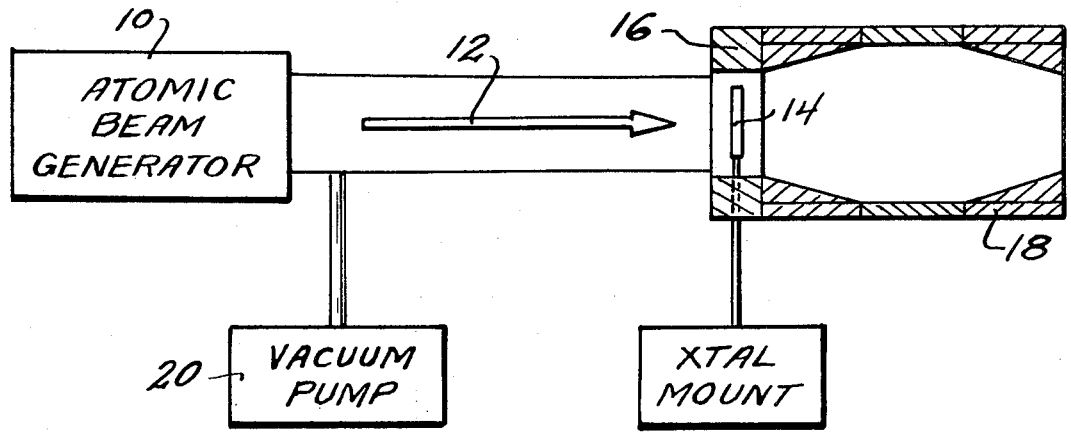
FIG. 1 is a block diagram of an apparatus for the practice of the method of the present invention.

A specific apparatus for the practice of the general aforedescribed method is illustrated in FIG. 1. A beam generator 10 generates a beam of atoms 12 to strike the surface of a ferromagnetic monocrystalline material 14 parallel to a lattice channel thereof. The monocrystalline material 14 is rotatably mounted to enable alignment of the lattice channel direction in the monocrystalline material relative to the generated beam 12. A magnet 16 provides a D-C magnetic field through the monocrystalline material 14 normal to the direction of said atomic beam sufficient to effect magnetic saturation of the material. Subsequent to the monocrystalline material 14, a second D-C magnet 18 is mounted to provide a shaped magnetic field through which the generated beam 12 passes. The aforedescribed structure is housed so that the beam generation and transmission through the monocrystalline material 14 and the magnetic field from magnet 18 is accomplished in a partial vacuum of approximately $10^{-6}$ torr maintained by a vacuum pump 20.

Further understanding of the method of the present invention may be obtained by considering the operation of the apparatus of FIG. 1. For purposes of illustration, the operation is described effecting the generation of nuclear-polarized neutral hydrogen atoms. It is to be understood that the method of the present invention is not to be limited thereto but is equally applicable for the generation of other polarized atoms.

Figure 2:
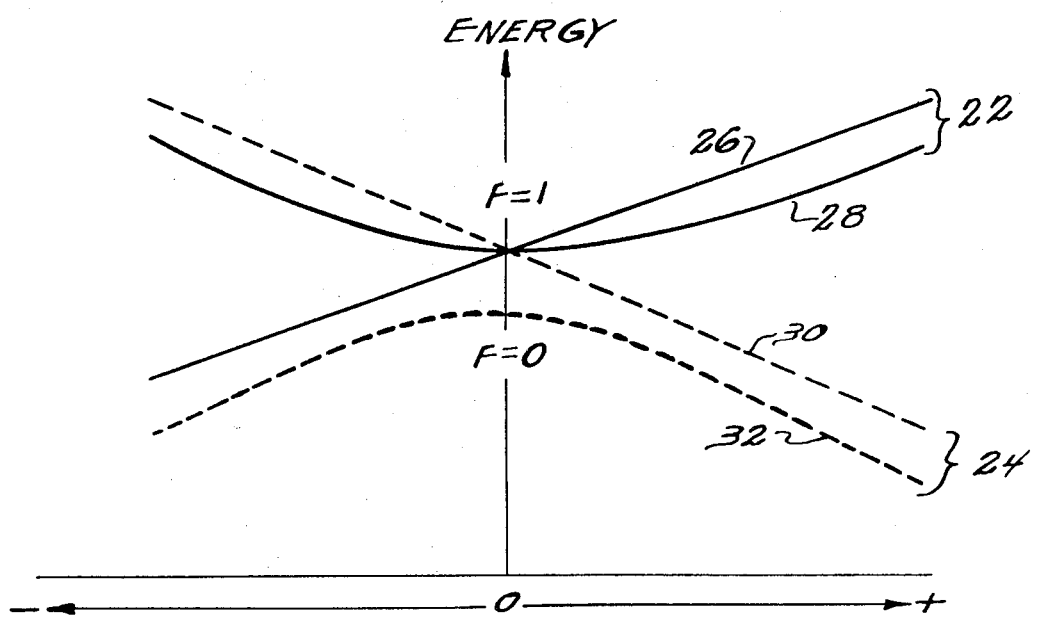
FIG. 2 is a hyperfine-structure diagram of hydrogen atoms as they pass through the apparatus of FIG. 1.

To enable further understanding of the method reference is made to FIG. 2 wherein is illustrated the hyperfine-structure diagram for hydrogen atoms. The atoms of hydrogen may be divided into two groups. The first group 22 is designated wherein the total angular momentum of the electron of the hydrogen atom has a value equal to $+\frac{1}{2}$. The second ground 24 is designated wherein the total angular momentum of the electron of the hydrogen atom has a value equal to $-\frac{1}{2}$. In each group 22 and 24 there are two subgroups. Subgroup 26 of group 22 exists for $M_J = +\frac{1}{2}$ and $M_I = +\frac{1}{2}$ wherein:

$M_J$ is defined as the total angular momentum of the electron of the hydrogen atoms; and $M_I$ is defined as the spin quantum number of the atomic nucleus of the hydrogen atom.

Subgroup 28 of group 22 exists for $M_J = +\frac{1}{2}$ and $M_I = -\frac{1}{2}$. —p1 Subgroup 30 of group 24 exists for $M = -\frac{1}{2}$ and $M_I = -\frac{1}{2}$.

Subgroup 32 of group 24 exists for $M_J = -\frac{1}{2}$ and $M_I = +\frac{1}{2}$.

In the apparatus of FIG. 1, the atoms to be polarized are transmitted parallel to a lattice channel in the monocrystalline material 14 at a minimum average velocity relative the material to enable the charge-transfer reaction to take place. For positive hydrogen atoms, the charge-transfer reaction enabling energy has a minimum value of approximately 10,000 electron-volts whereupon the positively charged hydrogen atoms are neutralized by picking up electrons from the material 14 in a preferential direction, for example $M_J = +\frac{1}{2}$. Thus with a preferential direction of $M_J = +\frac{1}{2}$, the neutral hydrogen beam output from the monocrystalline material 14 populates only the levels 26 and 28 of group 22 in the hyperfine diagram and there are no hydrogen atoms in groups 30 and 32 of group 24.

Upon emerging from the monocrystalline material 14, the electron-polarized hydrogen beam passes through three magnetic-field regions generated by magnet 18. The first region is a strong-magnetic field which decreases from maximum magnetic field to essentially a zero magnetic field. The second region is an essentially zero-magnetic field and includes the zero-field crossing from the first region to the third region, which is a second strong-magnetic field opposite in polarity to the first strong field and increasing from essentially a zero field to maximum field. The hydrogen beam 12 is sequentially passed through these three regions.

With a properly constituted magnetic field from magnet 18, the populated subgroups 26 and 28 of group 22 will undergo transitions as shown in FIG. 2. Atoms of subgroup 26 in group 22 will be transformed to have a quantum number $M_J = +\frac{1}{2}$, $M_I = +\frac{1}{2}$. Atoms in subgroup of group 22 will be transformed to have a quantum number $M_J = -\frac{1}{2}$, $M_I = +\frac{1}{2}$. Thus, the hydrogen beam appearing at the output of magnet 18 will have a vector nuclear polarization of $\pm 1.0$. That is, there will be a 100 percent vector nuclear polarization of the neutral hydrogen atoms in the beam.

To achieve the aforedescribed transitions, it is necessary that the gradient of the magnetic fields and the length of the essentially zero field region relative to the atomic beam energy be such as to permit adiabatic transitions. Further, to achieve the transition from one side of the hyperfine diagram in FIG. 2 to the other side, the field reversals near zero magnetic field have to be "sudden" so that the magnetic fields seen by the neutral hydrogen atoms in the beam reverse fast enough so that the atoms maintain their spatial spin orientation whereby their orientation with respect to the magnetic field is changed. Thus, the essentially zero field region extends for a length sufficient to permit adiabatic transition of the atoms in the beam while permitting the atoms to maintain their spatial spin orientation during the polarity reversals of the magnetic fields in the first and third field regions so that the spin orientation of the atoms relative to the strong magnetic field is changed.

A graphical plot of the magnetic field profile of magnet 18 is shown in FIG. 3. For the practice of the present invention, the strong magnetic fields of the magnet 18 have to have a maximum value such that the nuclear spin of the atoms in the beam is decoupled from the total angular momentum of the electron shell. For hydrogen atoms, the strong magnetic fields should have a maximum value of approximately 1,000 gauss to insure this decoupling is effected. Further, to effect the aforedescribed adiabatic transition with hydrogen atoms having energies of 10,000 electron volts, the strong magnetic fields should have a gradient of approximately 5 gauss/cm and the zero magnetic field of the second region should have a gradient of 0.5 gauss/cm and extend a distance of approximately 1 meter, the zero-field crossing being midway in the second region.

With the aforedescribed method, nuclear-polarized neutral hydrogen atoms are produced having a vector polarization of $\pm 1.0$ (i.e. 100 percent). It will be appreciated that nuclear-polarized atoms which are neutral, positive, or negative in charge may be produced according to the method of the present invention. For example the above described nuclear-polarized neutral hydrogen atoms may be passed through a conventional charge-transfer foil after magnet 18 to provide nuclear-polarized positive or negative hydrogen atoms.

For the operation of the method of the present invention on deuterium atoms to produce nuclear-polarized deuterium atoms, reference is made to FIG. 4 wherein is shown the hyperfine-structure diagram for deuterium atoms.

The atoms of deuterium may be divided into two groups. The first group 34 is designated wherein the total angular momentum of the electron of a deuterium atom has a value equal to $+\frac{1}{2}$. The second group 36 is designated wherein the total angular momentum of the electron of a deuterium atom has a value equal to $-\frac{1}{2}$. In each group 34 and 36, there are three subgroups.

Subgroup 38 of group 34 exists for $M_J = +\frac{1}{2}$ and $M_I = +1$ wherein $M_J$ is defined as the total angular momentum of the electron of the deuterium atom; and $M_I$ is defined as the spin quantum number of the atomic nucleus of the deuterium atom.

Subgroup 40 of group 34 exists for $M_J = +\frac{1}{2}$ and $M_I = 0$.

Subgroup 42 of group 34 exists for $M_J = +\frac{1}{2}$ and $M_I = -1$.

Subgroup 44 of group 36 exists for $M_J = -\frac{1}{2}$ and $M_I = -1$.

Subgroup 46 of group 36 exists for $M_J = -\frac{1}{2}$ and $M_I = 0$.

Subgroup 48 of group 36 exists for $M_J = -\frac{1}{2}$ and $M_I = +1$.

With the apparatus of FIG. 2, positively charged deuterium atoms are transmitted parallel to a lattice channel in the monocrystalline material 14 at a minimum average velocity relative the material to enable the charge-transfer reaction to take place therewith. For positive deuterium atoms, the charge-transfer reaction enabling energy has a minimum value of approximately 20,000 electron volts whereupon the positively charged deuterium atoms are neutralized by picking up electrons from the material 14 in a preferential direction, for example, $M_J = +\frac{1}{2}$. Thus, with a preferential direction of $M_J = +\frac{1}{2}$, the neutral deuterium beam output from the monocrystalline material 14 populates only the level 38, 40, and 42 of group 34 in the hyperfine diagram and there are no deuterium atoms in subgroups 44, 46, and 48 of group 36.

Upon emerging from the monocrystalline material 14, the electron-polarized deuterium beam passes through the aforedescribed three magnetic field regions generated by magnet 18. The magnetic-field profile generated by magnet 18 is the same as hereinbefore described and illustrated in FIG. 3. Further, it is requisite that the conditions for adiabatic transition be maintained and that the field reversals near zero be "sudden." For deuterium atoms, the strong magnetic fields generated by magnet 18 should have a maximum value of approximately 200 gauss to insure that the nuclear spin of the atoms in the beam is decoupled from the total angular momentum of electron shell. For adiabatic transition with deuterium atoms having energies of 20,000 electron volts, the strong magnetic fields should have a gradient of approximately 5 gauss/cm and the zero field of the second region should have a gradient of 0.5 gauss/cm and extend a distance of approximately 1 meter, with the zero-field crossing being midway in the second region.

The emerging nuclear polarized neutral deuterium beam from magnet 18 has a vector polarization of ± 0.66 and a minimum tensor polarization of 0. That is, a nuclear-polarized deuterium output beam may be obtained having a vector polarization of 66 percent of the theoretical limit with zero tensor polarization.

It will be further appreciated that the method of the present invention may be applied to other atomic beams such as helium-3 of lithium-6. When the method is applied to helium-3 atoms, the parameters as aforedescribed for hydrogen are applicable. When the method is applied to lithium-6 atoms, the parameters as described hereinbefore for deuterium are applicable.

Persons skilled in the art will, of course, readily adapt the general teachings of the invention to methods far different than the methods illustrated and described above. Accordingly, the scope of the protection afforded the invention should not be limited to the particular methods illustrated in the drawings and described above, but should be determined only in accordance with the appended claims.

The embodiments of the invention in which an exclusive property or privilege is claimed are defined as follows:

1. A method for effecting nuclear polarization of a beam of atoms comprising magnetically saturating a monocrystalline material; generating a partial vacuum; transmitting in said partial vacuum said atomic beam through said material in a direction parallel to a lattice channel in said material and normal to the direction of said magnetic saturation to effect a charge-transfer reaction therewith and produce electron polarization of said atoms; generating a shaped magnetic field including a first strong-magnetic-field region decreasing from maximum magnetic field to essentially zero magnetic field, a second essentially zero-magnetic-field region, and a third strong-magnetic-field region opposite in polarity to said first region and increasing from essentially zero magnetic field to maximum magnetic field; and transmitting in said partial vacuum said electron-polarized beam of atoms through said shaped magnetic field sequentially through the said three regions thereof to effect nuclear polarization of said atoms in said beam, said first and third strong-magnetic-field regions having a value to decouple the nuclear spin of the atoms in said beam from the total angular momentum of the electron shell thereof and a gradient to effect adiabatic transition of said atoms in said beam, said second essentially zero-magnetic-field region having a length relative to the energy of the atoms in said beam and a gradient to effect said adiabatic transitions thereof while maintaining the spatial spin orientation of said atoms during magnetic field polarity reversal between said strong magnetic fields of said first and third field regions.

2. The method according to claim 1 wherein said atoms are hydrogen or helium-3 atoms, said first and third magnetic-field regions have a maximum absolute value of approximately 1,000 gauss and a gradient of 5 gauss/centimeter, and said second magnetic-field region has a magnetic field interposed of said first and third field regions having a gradient of 0.5 gauss/centimeter over a length of approximately 1 meter.

3. The method according to claim 1 wherein said atoms are deuterium or lithium-6 atoms, said first and third magnetic-field regions have a maximum absolute value of approximately 200 gauss and a gradient of 5 gauss/centimeter, and said second magnetic-field region has a magnetic field interposed of said first and third field regions having a length of approximately 1 meter and a gradient of 0.5 gauss/centimeter.

* * * * *